June 10, 1924.  
F. GUY  
1,497,440  
APPARATUS FOR MOLDING BUILDING BLOCKS AND TILES  
Filed Oct. 11, 1922  
6 Sheets-Sheet 1

Inventor  
Frank Guy  
C. P. Goepel  
Attorney

June 10, 1924.  
F. GUY  
1,497,440  
APPARATUS FOR MOLDING BUILDING BLOCKS AND TILES  
Filed Oct. 11, 1922  
6 Sheets-Sheet 2

Inventor  
Frank Guy  
C. P. Goepel  
Attorney

June 10, 1924.  
F. GUY  
1,497,440  
APPARATUS FOR MOLDING BUILDING BLOCKS AND TILES  
Filed Oct. 11, 1922  6 Sheets-Sheet 3

June 10, 1924. 1,497,440
F. GUY
APPARATUS FOR MOLDING BUILDING BLOCKS AND TILES
Filed Oct. 11, 1922  6 Sheets-Sheet 4

Inventor
Frank Guy
C. P. Goepel
Attorney

Patented June 10, 1924.

1,497,440

UNITED STATES PATENT OFFICE.

FRANK GUY, OF CHELSEA, VICTORIA, AUSTRALIA.

APPARATUS FOR MOLDING BUILDING BLOCKS AND TILES.

Application filed October 11, 1922. Serial No. 593,673.

*To all whom it may concern:*

Be it known that FRANK GUY, subject of the King of Great Britain, residing at Holme Lea, Chelsea, Victoria, Australia, has invented certain new and useful Improvements in the Apparatus for Molding Building Blocks and Tiles, of which the following is a specification.

This invention relates to improvements in apparatus for use in molding concrete and other composition into various commercial articles, and refers more particularly to the molding of articles for use in building construction such as single or double blocks, for single or cavity walls respectively, and roofing tiles.

The object of the present invention is to provide a simple and thoroughly efficient apparatus for forming building blocks and tiles in a rapid and convenient manner and for colouring the surface of the same.

We accomplish the abovementioned object by providing a machine comprising a frame having a horizontal endless conveyor adapted to convey moulds from one end to the other thereof, a device near the feed end of the conveyor for delivering colouring matter to the moulds as they pass therebeneath, a feed hopper for supporting a quantity of molding composition above the conveyor, mechanism actuated by the passage of the moulds beneath the hopper for controlling the discharge of material from the said hopper, and a pressure device near the discharge end of the conveyor for compressing the material in the moulds.

The invention likewise comprises improvements in the construction of the moulds whereby the parts thereof can be readily assembled and taken apart and in the means for controlling the delivery of the colouring matter and the composition to the moulds.

In operation the required set of moulds are assembled and placed in succession upon the conveyor on which they are carried to and under the filling mechanism thence to the press attachment in the case of closed moulds and finally to the take off point from which they are taken and stacked in racks for setting. As the contents set the moulds are dismantled and returned to the assembling point of the apparatus and again placed upon the conveyor so that a continuous cycle of operations is maintained.

In order that the invention may be readily understood reference will now be had to the accompanying sheets of explanatory drawings wherein—

Figures 3 to 12 and 17 to 21 inclusive are drawn to larger scales than the other figures of the drawings.

In these drawings like characters of reference have been used to indicate similar parts in the different views and the numeral 10 designates a horizontal frame having supports 11 which can be provided with transport wheels 12 and a pole 13 for convenience of transport.

The ends of the horizontal frame are provided with through spindles 14 on which are mounted sprockets 15 adapted to support an endless chain conveyor 16 furnished with cross slats or bars 17.

The ends of the cross slats 17 project beyond the conveyor chains and rest upon inwardly projecting flanges 18 which extend nearly the full length of the frame and support both the upper and lower parts of the conveyor in horizontal alignment.

The conveyor 16 is operated from a driving shaft 19 through gearing 20 meshing with a spur wheel 21 on the spindle 14 located at the discharge end of the machine. The driving shaft 19 is fitted with fast and loose belt pulleys 22 or other approved means for transmitting motion thereto.

Some of the cross slats 17 on the conveyor 16 are provided with upwardly projecting locating stops 23 which are adapted to position moulds 24 (see Figure 8) at regular intervals apart thereon.

The moulds are placed on the conveyor with their rear ends against the locating stops and when the conveyor is in motion the said stops cause the moulds to be carried in correct alignment over the frame.

When the moulds have been carried a short distance by the movement of the conveyor their forward ends strike against and actuate a pivoted tappet 25 which is connected by a link 26 to a pivoted clutch lever 27. The movement of the clutch lever 27 causes a clutch member 28 slidably mounted on a spindle 29 to be brought into engagement with a second clutch member 30 formed on a sprocket 31 revolubly mounted on the said spindle 29 at one end of a circular brush 33 rotatively mounted in the lower end of a hopper 34.

The hopper 34 is supported above the conveyor and in the bottom thereof is a transverse discharge opening which is closed by the brush 33. The hopper is adapted to contain colouring matter in a powdered form and when the brush is revolved portion of the powdered colouring matter is sprinkled over the surface of the mould as it passes therebeneath.

Figures 1, 2:
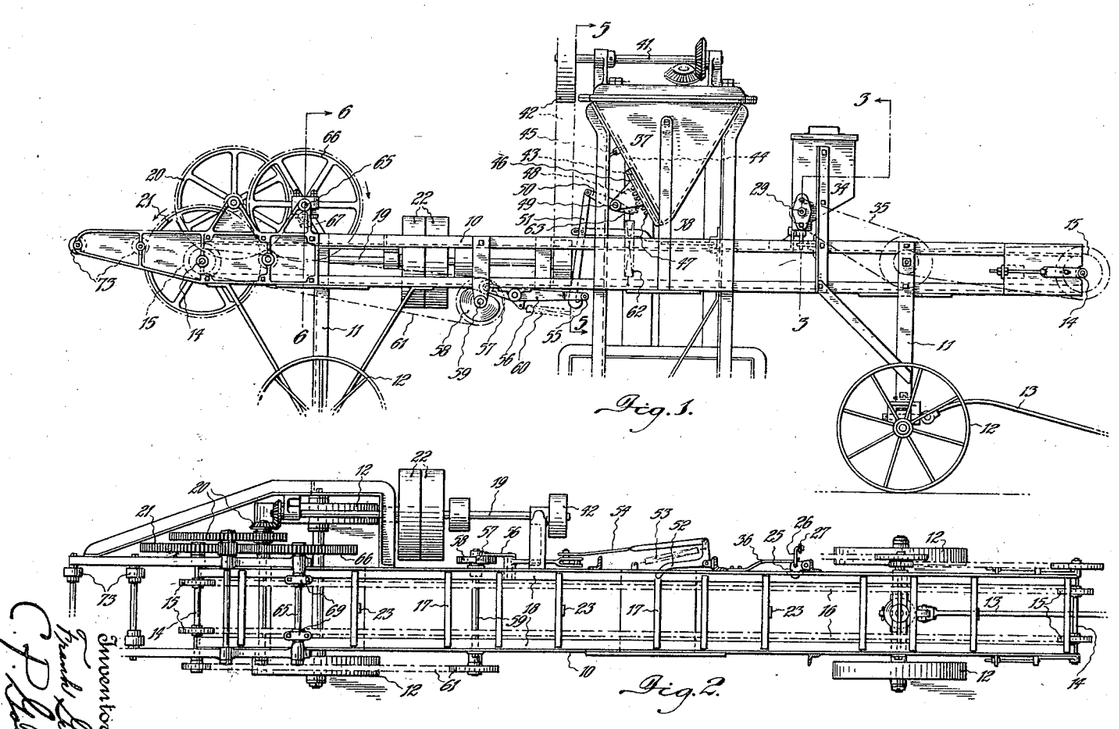
Figure 1 is a view in front elevation of a machine constructed in accordance with the present invention and adapted for use in molding roofing tiles.
Figure 2 is a view in plan of Figure 1 with portions removed for convenience of illustration.
Figure 3:
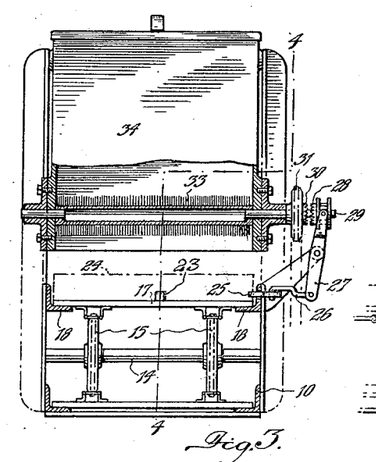
Figure 3 is a view in sectional end elevation taken on the dotted line 3—3 of Figure 1.
Figure 4:
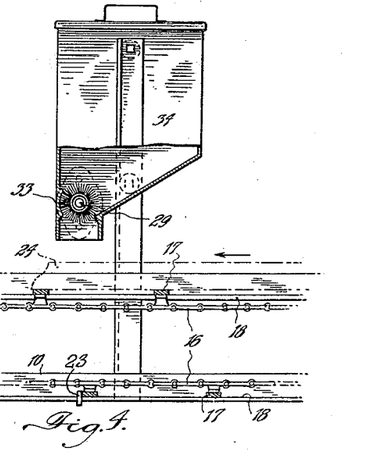
Figure 4 is a view in sectional side elevation taken on the dotted line 4—4 of Figure 3.

The sprocket 31 is rotated continuously by chain and sprocket gearing 35 from the conveyor spindle 14 located at the feed end of the machine. In Figure 1 the connection is shown as through the intermediary of interposed reduction gearing, but in Figures 13 and 16 no intermediate gearing is employed the connection being a direct one. When a mould passes beyond the tappet 25 the said tappet is returned to its normal position by means of a spring 36 which is secured to the frame and tends to exert an inward pressure on the tappet.

Figure 5:
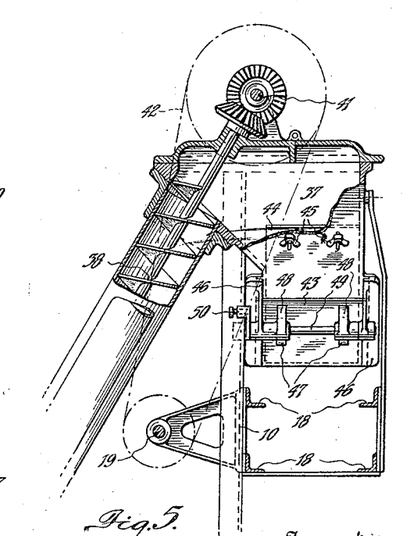
Figure 5 is a view in sectional end elevation taken on the dotted line 5—5 of Figure 1, with parts shown in section which are not cut by the dotted line.
Figure 6:
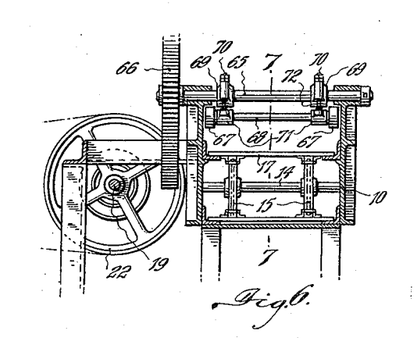
Figure 6 is a view in sectional end elevation taken on the dotted line 6—6 of Figure 1.
Figure 7:
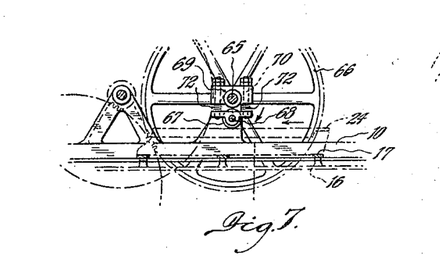
Figure 7 is a view in sectional side elevation taken on the dotted line 7—7 of Figure 6.

A feed hopper 37 is situated above a central part of the frame for containing the material to be moulded into tiles or the like. The molding material is fed to the hopper by means of an Archimedean screw elevator 38, see Figures 1 and 5, or by means of a bucket elevator 38′ from a boot 39 see Figure 12 of the drawings.

Figure 12:
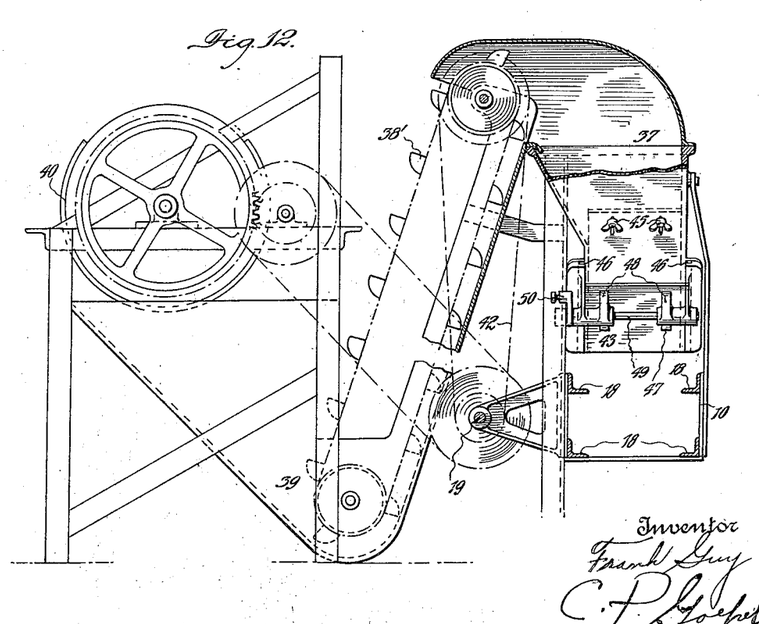
Figure 12 is a view in sectional end elevation of the machine showing a modified form of delivering device for the molding composition in association with a mixer shown diagrammatically on the left hand side of this view.

In Figure 12 of the drawings a mixer 40 is shown diagrammatically above the boot 39 and it will be obvious that the said mixer can be of any ordinary construction and supported and operated in an approved way.

The elevator is driven from a spindle 41 supported rotatively above the feed hopper 37 and motion is imparted to the said spindle by belt and pulley gearing 42 from the driving shaft 19.

The bottom of the feed hopper 37 is provided with a discharge outlet which is normally covered by a slidingly mounted plate valve 43. The size of the discharge outlet can be regulated for controlling the flow of material from the hopper 37 by means of a plate 44 which is adjustably secured to one side of the said hopper, as by thumb nuts and screws 45.

The plate valve 43 is supported in guides 46 and is provided with racks 47 on its outer face which are adapted to mesh with toothed sectors 48 fitted to a shaft 49 carried by brackets on the said hopper.

An arm 50 is fitted to the forward end of the shaft 49 and pivotally connected to the said arm is the upper end of a depending link 51 having a hook shaped lower end.

When the mould is passing under the feed hopper 37 its front end comes into contact with one arm of a bell-crank shaped tappet 52 which is pivoted to the side of the frame and is kept pressed inwardly by means of a spring 53. The second arm of the tappet 52 projects outwardly from the pivot point and is connected by a rigid bar 54 to the link 51 depending from the arm 50 on the sector shaft.

The outward movement of the first mentioned arm of the bell crank tappet 52 by the contact of the mould therewith causes the lower end of the link 51 to be moved toward the feed end of the machine and the hook on the lower end to engage a stud 55 on the end of a lever 56 pivoted to the underside of the frame.

The opposite end of the lever 56 is fitted with a roller 57 which is kept bearing on the face of a cam 58 carried on a shaft 59 by means of a spring 60.

The cam shaft 59 is driven continuously by chain and sprocket gearing 61 from the spindle 14 at the discharge end of the frame of the machine.

When the stud 55 on the lever 56 is engaged by the hook on the lower end of the depending link 51 the oscillating movement of the said lever causes the sectors 48 to be operated to open the valve 43 normally covering the discharge outlet of the hopper 37. During the time the valve 43 is in its open position sufficient molding material will pass from the hopper 37 to the mould to form a tile or other article to be formed by the said mould, the parts being adjusted to permit of this being accomplished.

When the mould passes beyond the tappet 52 the plate valve 43 is closed by the action of a spring 62 which is connected to an arm 63 on the sector shaft 49 and this spring together with the spring 53 causes the tappet 52 and parts connected thereto to be returned to their normal positions simultaneously with the closing of the valve 43.

When the filled mould is carried beyond the hopper 37 a top 64 is manually placed thereon and the said mould is then carried beneath a rotary pressure appliance which is adapted to press the top down on the mould so as to compress the material thereon and ensure every part being completely filled.

The pressure appliance comprises a transverse shaft 65 which is driven by a spur wheel 66 from the wheel 21 and rollers 67 which are carried on a spindle 68 resiliently mounted on and adapted to rotate with the shaft 65.

The resilient mounting for the spindle 68 may comprise bosses 69 on the shaft which are adapted to slidably support guide pins 70 carried by plates 71 having bearings for revolubly supporting the said spindle. The guide pins 70 are fitted with compression springs 72 which are adapted to yield when the rollers are brought into contact with the top of the mould. The spindle 68 revolves with the shaft 65 in the direction of the travel of the mould and when the said mould passes beyond the sphere of operation of the press it is directed by the conveyor on to a series of rollers 73 mounted transversely on the discharge end of the frame 10. The moulds are manually removed from the rollers 73 and placed on a rack or the like for drying purposes in the ordinary way.

Figure 8:
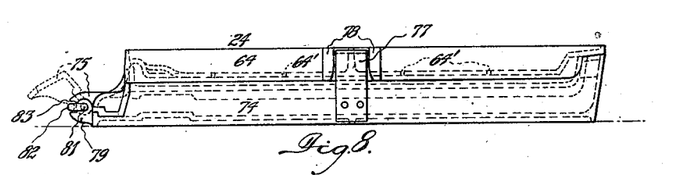
Figure 8 is a view in side elevation of a roofing tile mould designed for use with the machine shown in Figures 1 and 2.
Figure 9:
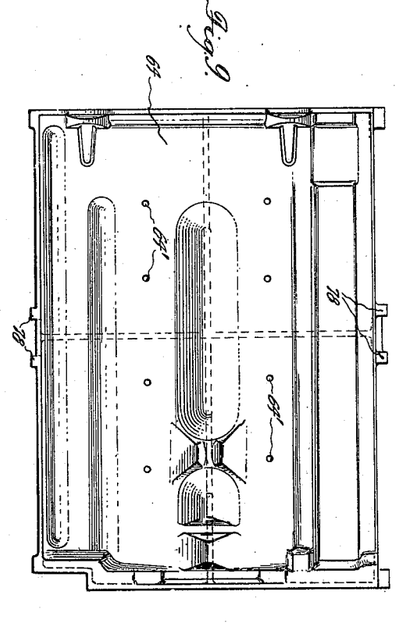
Figure 9 is a view in inverted plan of the top part of the mould shown in Figure 8.
Figure 10:
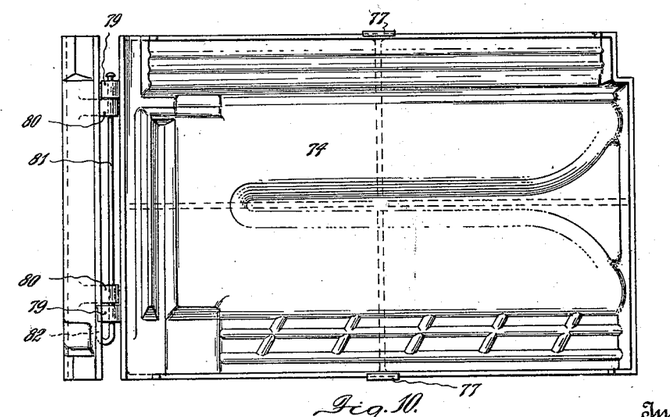
Figure 10 is a view in plan of the tile mould with the top part removed.

The mould 24 for forming roofing tiles is shown in Figures 8, 9 and 10 and comprises a bottom part 74 having a hinged end 75 and a removable top part 64.

The bottom part of the mould shown in the drawings is adapted to shape the top surface of a tile and the top part of the mould is designed to shape the under surface thereof.

The sides of the bottom part 74 are provided with upwardly projecting spring lugs 77 which are adapted to be engaged by jaws 78 on the sides of the top part when the top is placed correctly on the said bottom part.

The lower end of a roofing tile in some cases is bevelled and in order to permit of the finished tile being withdrawn from the mould the end thereof which shapes the bevelled part of the tile is hinged preferably as shown in Figures 8 and 10.

The hinge is formed by making lugs 79 on the bottom part of the mould and lugs 80 on the hinged end having a pin 81 passing therethrough. The hinge pin 81 is formed with a bent or returned end 82 which is arranged to lie parallel with the main portion thereof and this end 82 is adapted to be engaged by a recess 83 in one of the lugs 79. The pin 81 is free to move endwise so that the end 82 thereof can be moved into engagement with a recess in the adjacent lug 80 similar to the recess 83 when the end 75 is in its closed position. When the hinge pin is thrust inwardly the bent end 82 thereof locks the end 75 firmly to the mould and when the pin is withdrawn the said hinged end 75 can be opened out to permit the moulded article to be easily removed from the mould.

The top part of the mould is provided with a plurality of suitably disposed holes 64' through which any superfluous material is extruded during the pressing operation. By providing suitably shaped moulds flat building blocks can be formed in a like manner to the formation of roofing tiles.

Figures 13, 14, 15, 16:
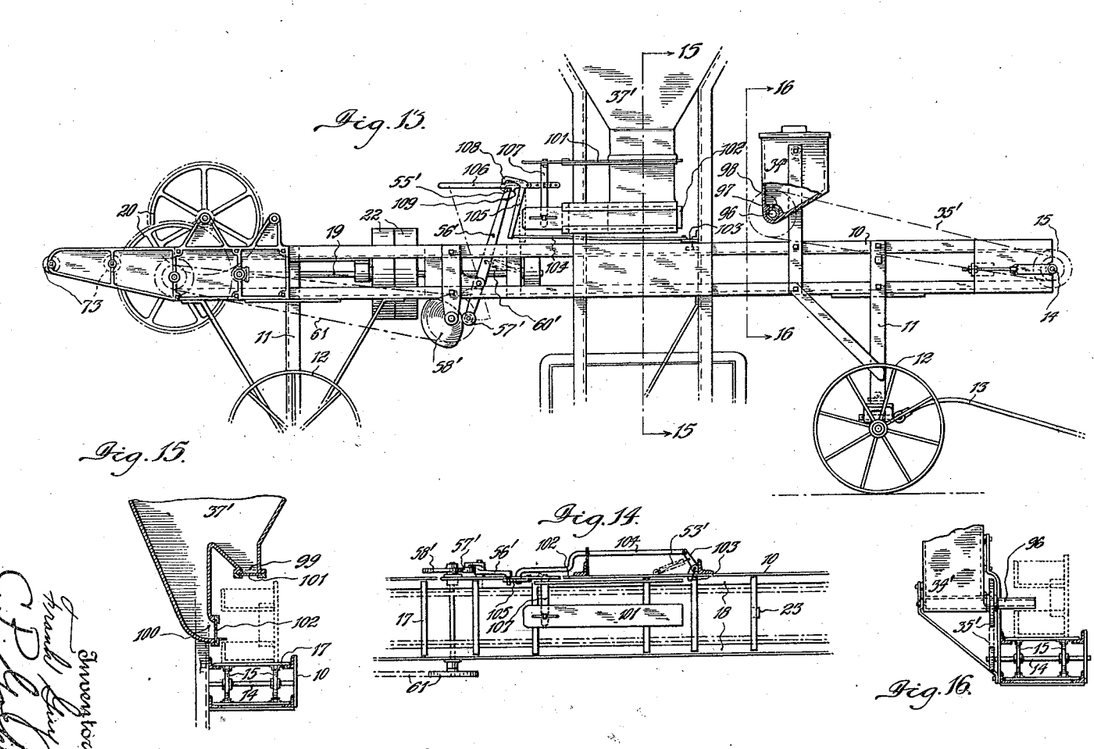
Figure 13 is a view in side elevation of the machine as adapted to take moulds for shaping building blocks.
Figure 14 is a view in plan showing part of the conveyor frame and means for controlling the delivery of molding material from a supply hopper, the hopper being omitted from this figure for convenience of illustration.
Figure 15 is a view in sectional end elevation of Figure 13 taken on the dotted line 15—15.
Figure 16 is a view in sectional end elevation taken on the dotted line 16—16 of Figure 13.
Figures 17, 18, 19, 20, 21:
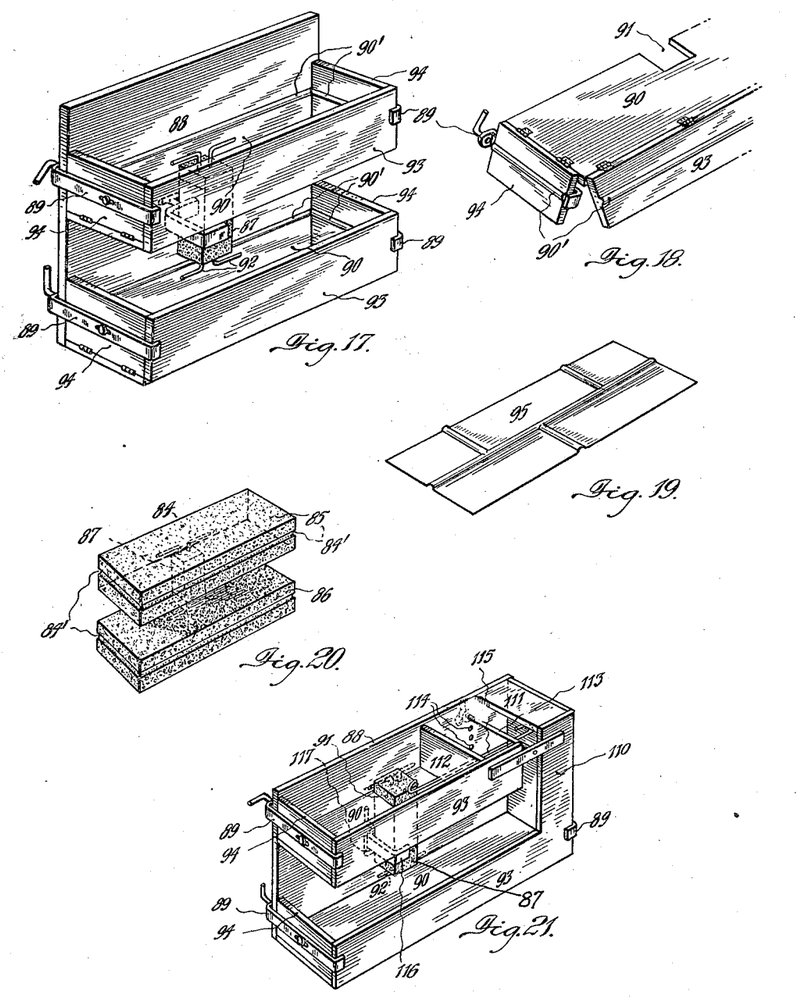
Figure 17 is a view in perspective of a collapsible mould for forming building blocks and designed for use on the modified form of the machine shown in Figure 13.
Figure 18 is a view in perspective of part of the mould shown in Figure 17.
Figure 19 is a view in perspective of a constructional detail of the mould for forming building blocks.
Figure 20 is a view in perspective of a block as shaped by a mould constructed as shown in Figure 17. This block is drawn to a smaller scale than the mould.
Figure 21 is a view in perspective of a modified form of mould designed to form corner blocks for use in erecting hollow walls of buildings.

In the modification shown in Figure 13 the machine is adapted to take moulds for forming building blocks 84 as shown in Figure 20 of the drawings. The block is designed to form hollow walls and consists of an inner flat slab 85 and an outer flat slab 86 having a bridge piece or tie 87 connecting their central portions.

The mould for forming these blocks is shown in Figures 17 and 18 and comprises a back board 88 to which is secured as by clamps 89 a pair of trays 90. The clamps 89 can be loosely secured to the ends of the trays as shown to facilitate the assembling of the mould. The said trays are located at a distance apart corresponding to the required wall cavity and a recess 91 is formed in one side of the upper tray to take the upper end of the bridge piece 87.

The bridge piece is previously formed of concrete with a reinforcing tie 92 having projecting ends which are adapted to be embedded in the inner and outer slabs of the blocks.

The detachable trays are formed with a hinged front 93 and two hinged ends 94 which when the clamps are unfastened can be turned down as shown in Figure 18 to release the moulded block. The sides of the trays are formed with beads 90' which are adapted to form grooves 84' in the edges of the moulded slabs to take reinforcing bars when same are used in constructing a building from the blocks.

In order to remove the block the trays are detached from the back board 88 and when opened out are pulled forwardly leaving the said block supported on the back board.

The bottom of the lower tray 90 can be covered with a die plate 95 which is placed thereon to form markings on the outer face of the block representing brickwork or the said plate can be shaped to give any other approved formation or finish to the face of the block.

The moulds for forming building blocks are placed on the feed end of the conveyor 16 and carried thereby over the frame in the manner hereinbefore described.

When the outer faces of the building blocks are coloured to represent brickwork the colouring matter preferably is introduced into the moulds in liquid form from a hopper 34' which is located above the frame in advance of a hopper 37' carrying the molding composition.

The bottom of the hopper 34' is shaped to accommodate a hollow rotary valve 96 of cylindrical form having one end projecting rearwardly therefrom so as to pass above the bottom tray of a mould as it is being carried to the hopper 37'. The hopper 34' is set forwardly of the frame so as to provide clearance for the moulds in passing the same.

The cylindrical valve 96 is provided with one or more holes 97 which is or are adapted to register with a hole or holes 98 in the bottom of the hopper 34' when the said valve is rotated.

The rotary valve is actuated by chain and sprocket gearing 35' from the spindle 14 at the feed end of the machine and is so timed that when a mould is opposite the hopper 34' the holes 97 and 98 are in register and colouring matter will flow from the hopper into the bottom tray.

The hopper 37' is provided with two outlets 99 and 100 covered by valves 101 and 102 respectively and these valves are arranged to open when a mould is brought opposite thereto so that molding material is delivered simultaneously into both trays.

The valves 101 and 102 are caused to open by the mould striking against and actuating a pivoted tappet 103 to which is connected a striking bar 104 adapted to bear against the depending arm of a bell-crank 105. The bell crank 105 is pivoted to a bar 106 carried by a bracket 107 adjustably secured to both valves 101 and 102 and the horizontal arm of the said bell crank terminates in a hook 108.

When the tappet 103 is thrust outwardly by the forward movement of the mould the bell-crank 105 is operated by the movement of the striking bar 104 to cause the hook 108 to move into the path of a pin 55' on one end of an oscillating cam lever 56' which is pivoted to a bracket on the machine frame. The opposite end of the cam lever 56' is fitted with a roller 57' which is adapted to bear on the face of a cam 58' mounted on the shaft 59 and the movement of this cam causes the lever 56' to be oscillated.

The lever 56' is oscillated continuously and when the stud 55' thereon is engaged by the hook 108 on its forward movement the next rearward movement of the lever will cause the valves 101 and 102 to be opened. Upon the return movement of the lever 56' the stud 55' thereon will contact with an abutment 109 on the bar 106 and cause the valves to be moved back to their closed positions.

The roller 57' on the cam lever is kept bearing against the face of the cam by a spring 60' and this spring together with a spring 53' connected to the tappet 103 causes the parts to be returned to their normal positions when the mould has moved beyond the said tappet.

The material delivered to the mould from the hopper 37' can be levelled off in any approved way during the time the moulds are passing from the said hopper to the delivery end of the machine.

Apart from the operation of the valves for controlling the discharge of the colouring matter and molding composition from their respective hoppers the machine operates in the same way as the machine hereinbefore described with reference to Figure 1 of the drawings.

In the modified form of the machine the pressure attachment for compressing the material in the moulds after filling is dispensed with.

In molding a corner block it is required that the outer slab be L-shaped and with one leg longer than the other for the purpose of breaking the bond at or near the corners of buildings.

A mould for these corner blocks is shown in Figure 21 of the drawings and in this view the front of the lower tray 90 is extended upwardly as at 110 to form a front for that part of the mould used for shaping the short leg of the outer slab of the corner block.

The upper part of the mould for forming the short leg of the outer or L-shaped slab of the block is closed by a board 111 and the adjacent end of the upper tray which is made shorter in this case than the bottom tray is closed by a board 112.

The upward extension 110 on the front of the lower tray and the adjacent end of the front of the upper tray are clamped securely against the end boards 111 and 112 by means of a clamp 113 and the back board 88 is provided with a series of holes 114 by means of which the clamp 113 can be adjusted to the most suitable position.

A tie bar 115 is employed to connect the short leg of the L-shaped outer slab to the inner slab and this tie bar together with the bridge piece 87 acts as reinforcements for the said block.

The bridge piece 87 is held in place within the mould by a clamp 116 which is passed through a hole 117 in the back board as shown in Figure 21 of the drawings.

The moulds for the corner blocks are first passed through the machine in a vertical position to fill the short leg cavity and when the material has partially set the moulds are repassed through the machine in a horizontal position to fill the trays 90 thereby completing the block.

Representations of stucco, brickwork or other design can be impressed upon the outer face surface of the blocks by fitting metal liners or die plates as 95 embossed with the required design within the moulds.

In lieu of conveying the moulds continuously under the hoppers they may be carried intermittently so that they remain stationary during the filling operations and the changes in the mechanism for producing this result can be readily devised by any skilled engineer.

Figure 11:
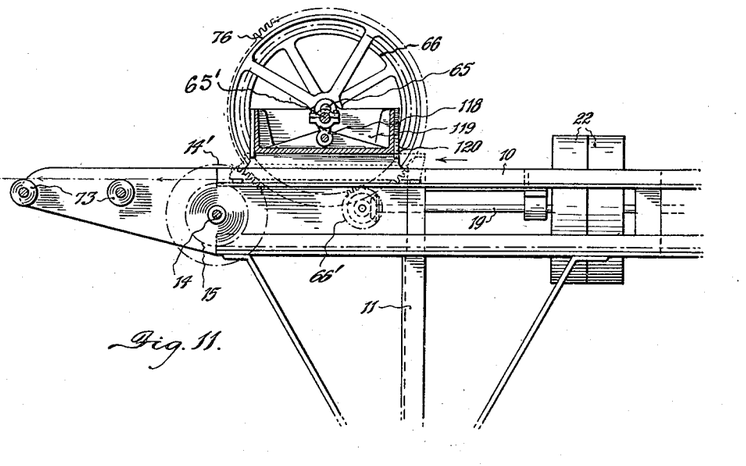
Figure 11 is a view in sectional elevation of the delivery end of the machine showing a modification in a constructional detail thereof.

In Figure 11 of the drawings I have shown one means of intermittently operating the conveyor and a modified form of press for compressing the material in the moulds for making roofing tiles.

In this view the shaft 65 is provided with a spur wheel 66 adapted to be driven by a pinion 66' from gearing connected to the driving shaft 19. A wheel 76 having part only of its periphery provided with gear teeth is fitted to the shaft 65 and the teeth on this wheel are adapted to mesh with the teeth of a pinion 14' mounted on the spindle 14 at the delivery end of the machine. In operation the conveyor will be caused to move when the teeth on the wheel 76 are in mesh with the pinion 14' and during the time that portion of the wheel 76 without teeth is passing over the said pinion the conveyor will be stationary.

The periods of time during which the conveyor is moving and is stationary is determined by the number of teeth on the wheel 76 and therefore it is a simple matter to provide the amount of movement and the duration of the stationary period at each revolution of the said wheel.

The shaft 65 is formed with a crank 65' which is connected by links 118 to a ram or head 119 slidably mounted in vertical guides 120 on the frame and located above the path of the moulds 24. The ram is timed to operate so that it will move downwardly upon the top of a mould as it is carried thereneath by the conveyor.

It will be obvious that when it is not required to colour the faces of the tiles or blocks the devices for delivering colouring matter to the moulds can be rendered inoperative or detached from the machine.

The operation of the machine will be readily understood from the foregoing description and it will be obvious that certain changes in construction and operation of the parts thereof can be effected without departing from the spirit and scope of the invention.

I claim:

1. An apparatus for use in molding building blocks, roofing tiles and the like comprising a frame, a horizontal conveyor for conveying moulds thereover, a feed hopper located above the conveyor, said feed hopper having a discharge outlet in the bottom thereof, a valve covering the discharge outlet, rack and sector gearing for operating the valve, an oscillating lever, a link connected to the rack and sector gearing, a pivoted bell-crank tappet operatively connected to the rack and sector gearing and disposed in the path of movement of the moulds, constructed and arranged whereby when the tappet is actuated by the moulds passing over the frame the link will be placed in engagement with the oscillating lever and the discharge outlet opened to permit material to pass into the mold.

2. An apparatus for use in molding building blocks, roofing tiles and the like comprising a frame, a horizontal conveyor for conveying moulds thereover, a feed hopper located above the conveyor, said feed hopper having a discharge outlet in the bottom thereof, a valve covering the discharge outlet, racks on the valve, pivoted sectors meshing with the racks and having an operating arm connected thereto, a link depending from the arm of the sectors and terminating in a hook at its lower end, a tappet on the frame having a connection with the depending link, an oscillating lever on the frame having a stud thereon adapted to be engaged by the hooked end of the depending link when the latter is actuated by the movement of the tappet, and springs for returning the parts to their normal positions.

3. In an apparatus as claimed in claim 1, a press attachment located above the delivery end of the conveyor comprising a revolving shaft disposed transversely above the conveyor, a spindle resiliently supported on and arranged in alignment with said shaft, and rollers on the spindle adapted to yieldingly contact with the top of a mould as it is moving to the delivery end of the conveyor.

4. In an apparatus as claimed in claim 1, a revolving shaft disposed transversely above the conveyor, gearing for imparting motion to said shaft, bosses fitted to the shaft, a spindle arranged in alignment with the shaft, guide pins on the spindle adapted to slide freely in the bosses, springs mounted on the guide pins between the bosses and the spindle, and rollers on the spindle adapted to bear upon the top of a mould carried by the conveyor there-beneath.

5. In an apparatus as claimed in claim 1, a color hopper supported above the conveyor, a discharge outlet in the bottom of the hopper, a rotary brush located within the discharge outlet, a rotating driving member mounted loosely on the spindle of the brush, a clutch member slidably mounted on the spindle, a clutch lever and a pivoted tappet connected to the clutch lever and adapted to be actuated by the movement of the mould as it passes beneath the hopper, constructed and arranged whereby when the tappet lever is actuated the slidably mounted clutch member will be forced into engagement with the driving member and the brush will be rotated to sprinkle colouring matter through the discharge outlet of the hopper into the mould.

6. In an apparatus as claimed in claim 1, a frame having a horizontal conveyor mounted thereon comprising a pair of endless chains passing around sprocket wheels, cross slats connecting the chains, locating stops on some of the cross slats, horizontal ledges on the frame adapted to support the slats in horizontal alignment, and rollers on the discharge end of the frame to receive moulds passing from the conveyor.

7. In an apparatus as claimed in claim 1, a hopper containing an adjustable plate for regulating the discharge outlet of the hopper, and an elevator for delivering material to the said hopper.

8. In an apparatus as claimed in claim 2, a cam shaft disposed transversely above the frame and driven by gearing from the horizontal conveyor, a cam on the cam shaft, a roller on the oscillating lever, and a spring acting on the lever to maintain the roller in contact with the surface of the said cam.

9. In an apparatus as claimed in claim 1 a shaft disposed transversely above the discharge end of the conveyor and driven by gearing from a driving shaft, a gear wheel on the said shaft having teeth only on portion of its periphery, a pinion on one of the conveyor spindles adapted to mesh with the teeth on portion of the periphery of the gear wheel, a crank or eccentric on the shaft, a head or ram connected by a link to the crank or eccentric, and vertical guides for the said head or ram.

10. An apparatus for use in molding building blocks, roofing tiles and the like comprising a frame having a horizontal endless conveyor mounted thereover and adapted to convey moulds from one end to the other thereof, a device near the feed end of the conveyor for delivering colouring matter to the moulds as they pass therebeneath, a feed hopper for supporting a quantity of molding composition above the conveyor, mechanism actuated by the passage of the moulds beneath the hopper for controlling the discharge of material from the said hopper, and a pressure device near the discharge end of the conveyor for compressing the material in the moulds.

11. In an apparatus as claimed in claim 1, a mould having a removable top, spring lugs on the said mould, jaws on the top of the mould adapted to engage the spring lugs on the said mould, a hinge pin having a returned end, recesses in adjacent hinging lugs on the mould adapted to engage the returned end of the hinge pin, and holes in the top of the mould through which superfluous material is extruded when pressure is applied thereto.

In testimony whereof he has affixed his signature in presence of two witnesses.

FRANK GUY.

Witnesses:
CLEM A. HARK,
G. R. CULLEN.